(12) United States Patent
Calvert

(10) Patent No.: US 6,533,253 B1
(45) Date of Patent: Mar. 18, 2003

(54) LIGHT ATTENUATING EVAPORATIVE COOLING PAD

(75) Inventor: Phillip D. Calvert, Center, TX (US)

(73) Assignee: General Shelters of Texas, S.B. Ltd., Center, TX (US)

( * ) Notice: Subject to any disclaimer, the term of this patent is extended or adjusted under 35 U.S.C. 154(b) by 6 days.

(21) Appl. No.: 09/821,401

(22) Filed: Mar. 29, 2001

(51) Int. Cl.[7] ................................................ B01F 3/04
(52) U.S. Cl. ...................... 261/30; 261/100; 261/112.2; 428/185; 428/543
(58) Field of Search .......................... 261/29, 30, 36.1, 261/100–107, 112.2, DIG. 11; 428/169, 172, 184, 185, 543

(56) References Cited

U.S. PATENT DOCUMENTS

| | | | |
|---|---|---|---|
| 3,262,682 A | * 7/1966 | Bredberg | 261/112.2 |
| 3,265,550 A | 8/1966 | Lindqvist | 156/210 |
| 3,655,468 A | 4/1972 | Bastone et al. | 156/62.2 |
| 3,682,747 A | 8/1972 | Munters | 156/459 |
| 3,862,280 A | * 1/1975 | Polovina | 261/112.2 |
| 3,947,532 A | * 3/1976 | Skold et al. | 361/112.2 |
| 4,989,502 A | 2/1991 | Ospelt | 98/87 |
| 5,133,692 A | 7/1992 | Koop | 454/282 |
| 5,238,451 A | 8/1993 | Wulf et al. | 454/282 |
| 5,248,454 A | 9/1993 | Thomas | 261/112.2 |
| 5,601,485 A | 2/1997 | Gigola | 454/277 |
| 6,079,365 A | 6/2000 | Medlin et al. | 119/437 |
| 6,223,548 B1 | * 5/2001 | Clavert | 62/304 |
| 6,331,223 B1 | * 12/2001 | Wylie et al. | 156/160 |
| 6,378,322 B1 | * 4/2002 | Calvert | 62/314 |
| 6,409,157 B1 | * 6/2002 | Lundin et al. | 261/112.2 |

* cited by examiner

Primary Examiner—C. Scott Bushey
(74) Attorney, Agent, or Firm—Locke Liddell & Sapp LLP

(57) ABSTRACT

The present invention includes a evaporative cooling pad and method of making the same. The cooling pad features a non-reflective, non-light transmissive surface finish incorporated directly into the cooling pad. In one embodiment, this surface finish would be a dark color, gray to black, with a non-gloss surface The coupling of this type of finish and colored sheet with the plurality of angled cross-corrugated flutes featured on the cooling pad serves the function of breaking the light source at various flute angles and attenuating the light value during its passage through the cooling pad.

20 Claims, 7 Drawing Sheets

US 6,533,253 B1

LIGHT ATTENUATING EVAPORATIVE COOLING PAD

FIELD OF THE INVENTION

This invention generally relates to the attenuation of light in conjunction with evaporative cooling pads, more particularly to the use of light attenuating evaporative cooling pads used with evaporative coolers.

BACKGROUND OF THE INVENTION

Evaporative cooling has been a source of inexpensive cooling in the residential and commercial market since the early 1900's. In general, an evaporative cooling unit includes a housing having a fan and one or more water saturated cooling pads mounted therein. The fan is designed to draw air through the housing and across the water saturated pads. The air is cooled by moisture evaporation as the air passes through the pads. Evaporative coolers are particularly suited for outdoor use, or applications where air conditioning is impractical or cost prohibitive, such as warehouses, aircraft hangars, auto repair shops, and gymnasiums.

However, the benefit of evaporative cooling in farming and particularly in the poultry market was not known until the late 1950's and early 1960's. During this period, research efforts developed methods of raising poultry on a large-scale commercial farm environment. Evaporative cooling was found to be a very effective solution to increase the production and population of the flocks.

During the same period, research also discovered that ambient light intensity affected the feed conversion and growth characteristics of poultry. The use of devices to attenuate the light source coming into the containment building were tested with varying results. The tests showed that by decreasing light from natural-ambient levels, it was possible to grow healthier and more mature poultry. The tests indicated that the overall performance of the bird increases with a decrease in the light during development.

The typical evaporative cooling pad does not provide sufficient light attenuation to encourage the increased growth and productivity due to its relatively translucent structure. To date, farmers have had to use light attenuation systems for evaporative coolers that incorporate separate devices called "light traps." Light traps are typically fabricated from extruded or vacuum formed plastic profiles that form a blade having a series of surfaces at angles to each other. Multiple blades are assembled to form a complete light trap having "zigzagging" passages. The passage of light through the light traps is reduced by the indirect passages. The light traps can then be installed at the air inlet and/or outlet locations of he evaporative cooler. The light traps add complexity to the design, require extra space for shipping and installation, and add costs to the system. However, until the present invention, users of light attenuation devices have been relegated to the use of light traps for several decades without apparent options.

Therefore, a need exists to provide light attenuation in conjunction with cooling pads independent of light traps.

SUMMARY OF THE INVENTION

The present invention comprises an evaporative cooling pad and method of making and using the same. The cooling pad features a low reflective, low light transmissive surface finish incorporated directly into the cooling pad. In one embodiment, this surface finish would be a dark color, gray to black, with a low gloss surface. The coupling of this type of finish and colored sheet with the plurality of angled cross-corrugated flutes featured on the cooling pad serves the function of breaking the light source at various flute angles and attenuating the light value during its passage through the cooling pad.

While such features may represent an incremental step in the progress of cooling pad technology, such features heretofore have not been available. Prior to the invention, those in the art of evaporative coolers were relegated to the inclusion of separate light traps with the attendant costs of manufacturing and assembly of the light traps to an evaporative cooling fan system. The need for light attenuation has been long felt and the technology may have existed to solve the need. However, those with ordinary skill in the art did not appreciate or appropriate the solution offered by the present invention.

BRIEF DESCRIPTION OF THE DRAWINGS

A more particular description of the invention, briefly summarized above, may be had by reference to the embodiments thereof which are illustrated in the appended drawings and described herein. It is to be noted, however, that the appended drawings illustrate only some embodiments of the invention and are therefore not to be considered limiting of its scope for the invention may admit to other equally effective embodiments.

DETAILED DESCRIPTION OF THE INVENTION

Figure 1:
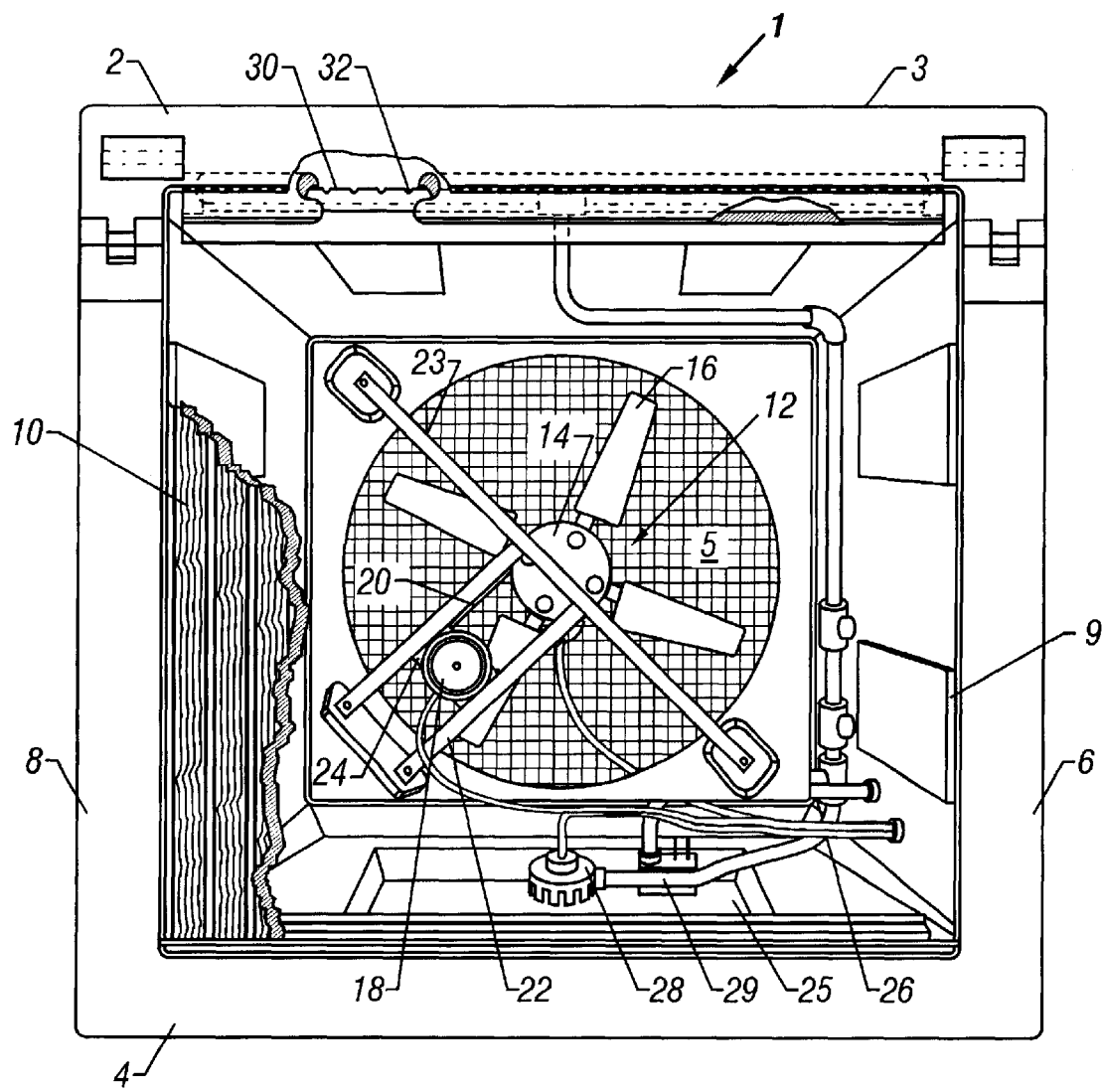
FIG. 1 is a schematic perspective rear view of one embodiment of a fan in the form of an evaporative cooler.

FIG. 1 is a schematic perspective rear view of one embodiment of a cooler 1. As an example, one cooler is described in U.S. patent application Ser. No. 09/273,096, filed Mar. 19, 1999, now U.S. Pat. No. 6,223,548, entitled "Cooler Housing Apparatus and Method of Making the Same" and is incorporated herein by reference. The cooler 1 can be mounted in various buildings (not shown), such as agricultural buildings, to provide ventilation and light attenuation in a wall, roof, or other portions of the building. Agricultural buildings include those used for poultry production in a large-scale commercial farm environment. Those skilled in the art will recognize that the inventive aspects as described herein are equally applicable to any building or structure where ventilation, cooling, and/or light attenuation would be helpful.

It should also be realized that the exemplary cooler can be modified in many respects and is representative of the general nature of evaporative coolers. Further, the cooling pad described herein can be used in other applications independent of evaporative coolers or even fans. For example and without limitation, the cooling pad can be suspended from a surface and transmit moisture and/or cooling effects through natural convection.

The cooler 1 generally includes a housing having a top 3, a bottom 4, and sides 6, 8. The housing 2 forms a structure in which various components may be mounted thereto. A portion of the cooler 1 includes a fan 12 that generally includes a hub 14 and a plurality of fan blades 16 attached thereto. A motor 18 can be used to drive the fan 12. Fan blades typically move ambient air and thus the term "air" is used as a convention. However, the term "air" used herein includes any media through which the fan blades move. The hub and blades rotate within an opening 5 formed in the housing 2. If the fan 12 is a belt-driven fan, the motor 18 is offset from a central axis of the hub. A drive member 20 can be coupled between the motor 18 and the hub 14. The drive member can include, for example, a drive belt, chain, gear, and other elements. The drive member 20 assists in transmitting torque from the motor 18 to the hub 14 to rotate the hub and the fan blades 16 attached thereto.

The housing 2 may be formed out of a variety of materials. In at least one embodiment, the housing is formed of a moldable material, such as polymeric compounds with or without fiber reinforcing materials and generally includes plastic materials.

A brace 23 may be disposed traverse at least a portion of the housing 2 to provide additional support for mounting the hub 14 and associated elements. Additional bracing, such as brace 22, can be coupled to the brace 23. The brace 22 can include a motor support 24. The motor support 24 supports the motor 18 in a proper orientation with the hub 14 and generally includes one or more holes for attaching the motor 18 thereto.

The housing 2 may include one or more supports 9 that are used to support an evaporative cooling pad 10. The evaporative cooling pad 10 provides a media through which cooling material, such as water, may be disposed thereon. Air is driven through the evaporative cooling pad 10 as the hub and fan blades rotate, so that the air lowers the effective temperature of ambient air by providing moisture thereto.

The bottom 4 of the housing 2 can include a recessed area 25. The recessed area 25 may form a canopy for holding water or other liquids that can be used in conjunction with the cooler 1. An inlet 26 is fluidicly coupled to the recessed area 25 for providing fluid thereto. A pump 28 is fluidicly coupled to a fluid contained in the recessed area 25. The pump 28 provides pressurized fluid into an outlet 29. The outlet 29 is coupled to a sprayer 30, generally disposed in an upper portion of the cooler 1. The sprayer 30 can include one or more ports 32 through which the fluid may be provided, for example, to the evaporative cooling pad 10. The cooling pad 10 allows the fluid to flow generally by gravity across surfaces of the pad as the air passes across the pad to effect the cooling described above.

Further, the housing 2 may include attachment sites (not shown) used for wheels or casters, provide other locations for fluid storage, and may include various aesthetic and ornamental aspects that distinguish the housing from predecessors in the prior art and allow the formation of product identity. The housing may include, for example, recesses that may strengthen the housing and offer a location for placement and protection of plumbing assemblies and connections thereto.

Figure 2:
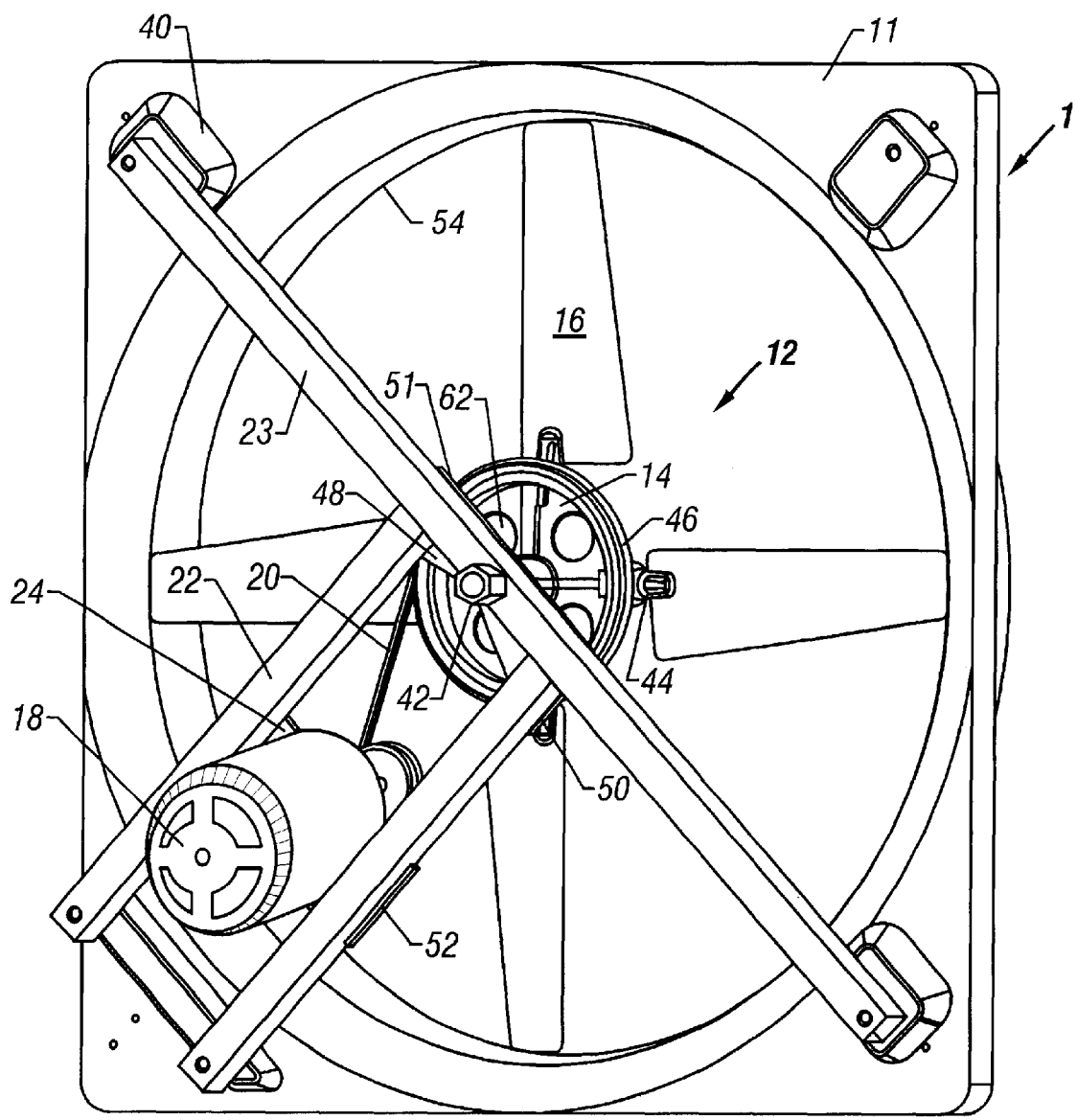
FIG. 2 is a schematic perspective rear view of the fan shown in FIG. 1.

FIG. 2 is a schematic perspective rear view of the cooler 1 shown in FIG. 1. A frame member 11 of the cooler 1 can be coupled to the housing 2 or can be formed integrally therewith. The frame member 11 can include one or more shelves 40. The shelves 40 provide an elevated surface to which the braces 22, 23 may be coupled thereto. The braces may be coupled by fasteners, adhesives, or other generally known attachment devices and methods.

In one embodiment, the brace 22 intersects the brace 23 in the area of the hub 14. Further, the brace 22 can be coupled to the motor support 24. The hub 14 can be rotationally coupled to the brace 23 by a shaft 42. The blades 16 are coupled to the hub 14 with a blade portion 44. The blade portion 44 can be removably coupled to the hub 14 and the blade adjusted to different pitch angles relative to the hub. The shaft 42 can be connected to the brace 23 and extend through the brace 23 into a central opening (not shown) of the hub 14. The hub 14 can rotate about the shaft 42.

A drive member 20 is generally disposed between the hub 14 and the motor 18. The drive member 20 is coupled to the hub about a drive surface 46. The drive surface can support a drive belt, gear, chain or other drive member. If a belt is used, typically the belt is a "V-drive" shaped belt, although other shapes of belts can be used. Alternatively, the motor can be directly coupled to the hub 14 to operate as a "direct-drive" unit.

A brace support 48 can be used to provide additional support at the intersection of braces 22, 23. The brace support 48 may be coupled to the braces 22, 23 by various methods of attachment such as mechanical fasteners using bolts, pins, screws, or other mechanical devices, or may be attached by adhesive methods, welding, or other attachment methods. Similarly, the motor support 24 may be coupled to the brace 22 in like fashion. In one embodiment, the housing, blades, hub, braces, and supports may be made from molded and corrosion resistant materials, and generally include polymeric and other plastic materials.

A venturi 54 can be coupled with the frame member 11. The venturi 54 can be integrally formed with the frame member 11 or the housing 2 or formed separately and attached thereto. The venturi 54 increases the air efficiency and may help reduce turbulence. Such reduction of turbulence increases a laminar flow of air through the cooler 1 for greater efficiency of air flow and fan performance. The venturi is described in more detail in copending U.S. patent application Ser. No. 09/796,420, filed Feb. 28, 2001, now U.S. Pat. No. 6,378,322, entitled "High-Performance Molded Fan", and is incorporated herein by reference.

Figure 3:
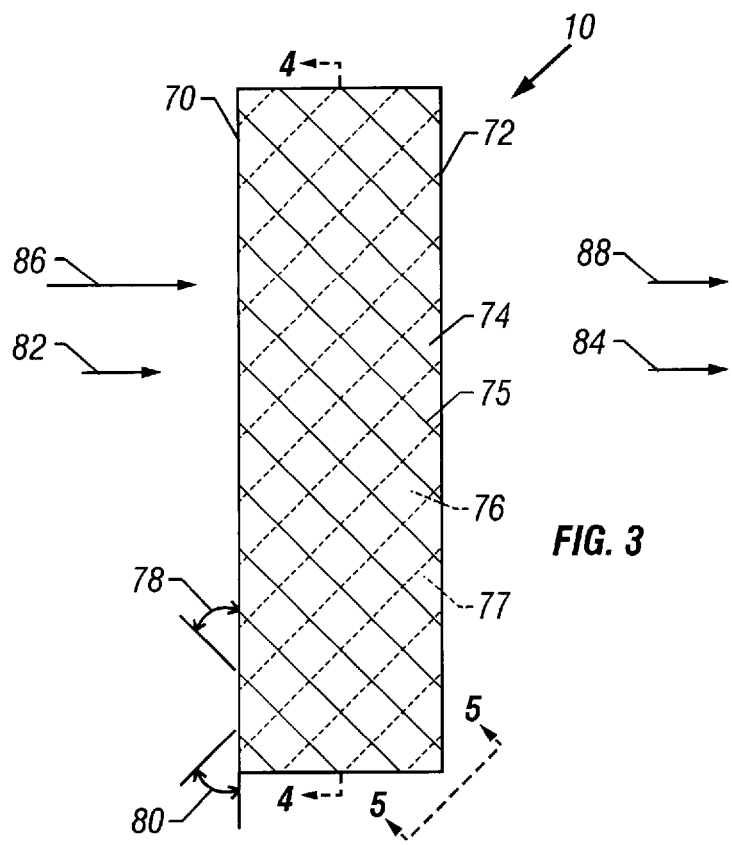
FIG. 3 is a schematic side view of a cooling pad 10.

FIG. 3 is a schematic side view of one embodiment of the cooling pad 10. The cooling pad is made from a plurality of sheets. In one embodiment, the sheets are made of paper, such as Kraft® paper, impregnated, formed, cured, glued together, and then cut to a variety of shapes. An exemplary method of forming the cooling pad will be described below regarding FIGS. 6–12.

In FIG. 3, the cooling pad 10 has a pad entrance 70 and a pad exit 72 through which air and/or light enters the pad and exits the pad. A first sheet 74 is formed with at least one first flute 75 and generally a series of such flutes parallel to each other. A second sheet 76 is formed with at least one second flute 77 and generally a series of such flutes parallel to each other. The sheets are coupled together to form a cooling pad 10. Additional sheets can be coupled to the first and second sheet to form a desired thickness for the pad 10. In one embodiment, the flutes of adjacent sheets are coupled at nonparallel angles. For example, the first sheet 74 can be situated so that the first flute 75 is disposed at a first flute angle 78 relative to the pad entrance 70. Similarly, the second sheet 76 can be situated so that the second flute 77 is disposed at a second flute angle 80 relative to the pad entrance 70. The adjacent sheets can be overlapped at the nonparallel angles, so that the flutes of each sheet are at angles relative to each other and/or relative to the pad entrance 70. For example, the first flute 75 can be disposed at the first flute angle and the second flute 77 can be disposed at the second flute angle, so that the relative angle is the sum of the first flute angle and second flute angle. In one embodiment, each flute angle can be generally at least about 5 degrees even though other angles can be used. Thus, the relative angle between the first flute angle and the second flute angle would be at least about 10 degrees. In one embodiment, the flute angles are each between about 30 degrees to about 60 degrees.

Figure 4:
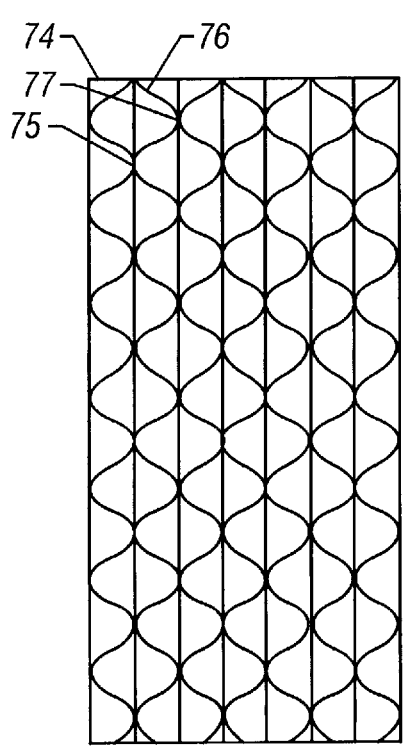
FIG. 4 is a schematic front view of the cooling pad 10 shown in FIG. 3.

FIG. 4 is a schematic cross-sectional view through the pad 10 taken at section 4—4 from FIG. 3. A cooling pad 10 can contain a plurality of sheets, such as the first sheet 74 and the second sheet 76. In at least one embodiment, the flutes 75 and 77 are arranged at nonparallel angles relative to each other so that each sheet is separated from the adjacent sheet by the flutes. Passages formed between flutes of adjacent sheets allow air and/or light therethrough.

Figure 5:
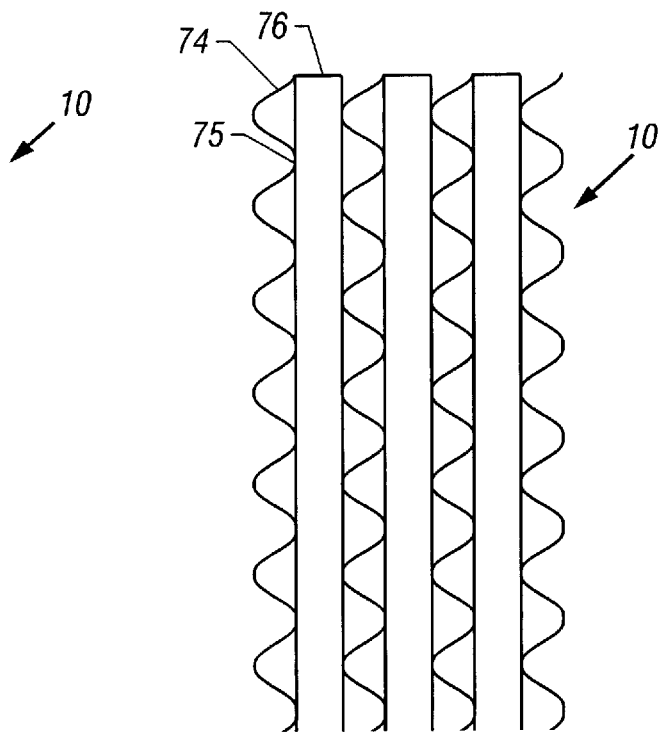
FIG. 5 is a schematic angled view at Section 5—5 shown in FIG. 3.

FIG. 5 is a schematic angled view along perspective 5—5 shown in FIG. 3. Perspective 5—5 is viewed parallel to the direction of the first flute 75 on the first sheet 74 and at a nonparallel angle to the second flute 77 on the second sheet 76. The first flute 75 contacts the second sheet 76 at various places between the sheets. The nonparallel angles of the flutes of the two sheets maintain spacing of the sheets from each other. The difference in flute angles between sheets 74, 76 results in a separation between the sheets which allows for air to pass through the evaporative cooling pad and to be cooled by evaporation.

Air entering the pad entrance can pass through the flute openings between the sheets 74, 76 and exit the pad exit 72. These aspects are shown in FIG. 3. Entering air 82 at the pad entrance 70 enters one or more of the openings formed between the multiple sheets of the cooling pad 10. The air is deflected through the various channels caused by the intersecting flutes and passes through the cooling pad to become exiting air 84.

In a natural state, the material of the sheet is generally translucent. Thus, light existent at the pad entrance 70 can diffuse through the openings and the material of the sheet, pass through the cooling pad and at least partially exit the pad exit 72. Light enters the pad entrance 70 as entering light 86. The light is deflected due to one or more flute angles 78, 80. At least a portion of the entering light 86 is allowed to exit the cooling pad at the pad exit 72 to become exiting light 88. However, in numerous applications, the exiting light 88 has a greater intensity than is desired due to the materials of the sheets. Heretofore, as described above, operators and manufacturers have been relegated to using a separate light attenuator. Typically, this light attenuator was mounted either at the entrance or exit of the cooling pad or both as a separate unit to further deflect light and reduce the light between the entrance and exit.

In contrast, the present invention provides a darkened pad material. The sheets of the pad material can be colored at some stage of the process to a darker color. The darker color reduces the light transference through a pad to a greater degree than the sheets in their natural state. In one embodiment, the color includes shades of dark grey to black although other colors can be used. Further, the surface can be a matte or flat finish, i.e., non-glossy finish. The matte or flat finish may further provide less reflection of incoming light through the cooling pad 10.

A variety of colorants can be used, including dyes, paint, and chemically reactive products. Examples of colorants include without limitation include dyes such as: inks, emulsifications of carbon black, and other tinting and coloring products. It should be noted that the colorant that is used is generally compatible with the underlying purpose of the cooling pad, that is, to absorb and retain a certain amount of moisture for cooling as the air passes therethrough. Thus, a colorant that totally seals the pores of the material can be inappropriate for the general purposes of the cooling pad.

As a further example and without limitation, it has been discovered that ferric oxide can be used to treat the sheets to a darker color. The ferric oxide reacts beneficially with a phenol product that is used to impregnate the sheet for forming the sheet with flutes. In one embodiment, a 5% ferric chloride solution is formed of ferric oxide mixed with water and chlorine. By applying a solution of ferric oxide to the sheet prior to curing the phenol on the sheet, the color of the sheet can be beneficially darkened. After curing, the ferric oxide can also be used to determine whether any noncured phenol remains as a quality control measure. One phenol that has been used successfully is GP-745D63, commercially available from Georgia-Pacific Corporation. However, it is to be understood that this resin is only exemplary as those with ordinary skill in the art can modify both of the resin and colorant to achieve the goal of providing a dark sheet for use as a cooling pad.

Figure 6:
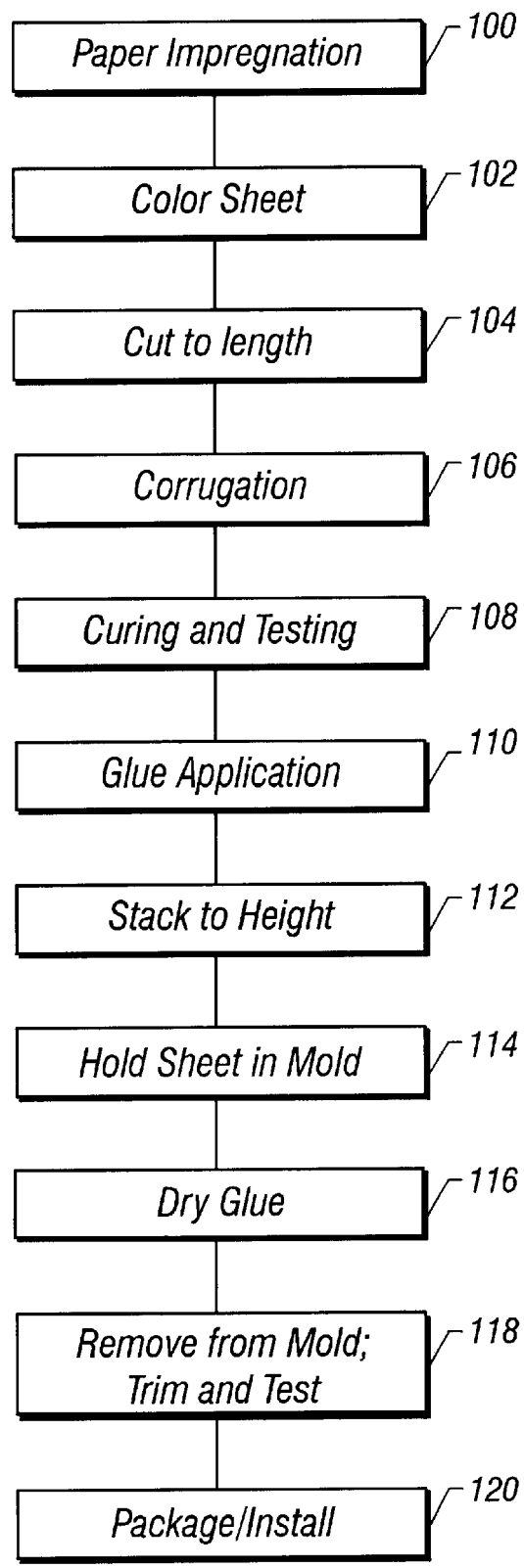
FIG. 6 is an exemplary flow chart showing one method of forming the cooling pad.

FIG. 6 is a schematic flow chart illustrating one exemplary method for manufacturing evaporative cooling pads 10. Step 100 includes the impregnation of sheets with a material that impacts mechanical strength and moisture resistance to the paper, such as phenolic resin. The sheets are strengthened when the resin is dried so that the shape and configuration of the sheets remain relatively stable during use. The paper is impregnated in accordance with procedures well known in the art. Advantageously, the paper itself can be 30 lb., unbleached Kraft® paper of impregnation grade. The paper texture is not critical. However, smoother textures assist to provide enhanced airflow. Suitable impregnation grade Kraft® paper is commercially available from a variety of sources, such as Westvaco, Inc.

A variety of phenolic resins known in the art can be used in the invention provided they provide the sheets with the required structural integrity and moisture resistance. One group of phenolic resins are those comprising the reaction product of an aromatic alcohol and an aldehyde, generally known in the art as phenolic or phenol/formaldehyde resins. Suitable aromatic alcohols for such resins include phenol, phenol alkylated with an alkyl moiety having up to about 5 carbon atoms, such as o-, m- and p-cresol, xylenol, p-tert-butylphenol, and p-amylphenol; and the class of compounds commonly known as bisphenols, e.g., 4,4'-alkylidene-diphenol. Examples of suitable bisphenols that can be used include 4,4'-isopropylidene-diphenol (commonly known as bisphenol-A), 4,4'-methylidene-diphenol and 4,4'-sec-butylidenediphenol. Other alkylated phenols and bisphenols are also suitable. Representative of suitable aldehydes for use in making the phenolic resin are formaldehyde, acetaldehyde, propionaldehyde, n-butylaldehyde, n-valeraldehyde, caproaldehyde, heptaldehyde and straight-chain aldehydes having a carbon number up to about 8.

One specific phenolic resin known to be useful in the present invention is GP-745D63, commercially available from Georgia-Pacific, Inc. Advantageously, the phenolic resin contains about 14% dry weight by content of resin, and has a moisture content of between about 9.5% and about 10.5% volatiles. However, more conventional resins having a lower moisture content, such as 4.5% to 5.5% may also be used with the invention.

In step 102, the sheets are colored. The sheets can be colored with a nonreactive colorant, such as ink, carbon black, or a variety of other dyes. In at least one embodiment, the colorant can be mixed with the impregnating resin, so that steps 100 and 102 are combined. For example and without limitation, a mixture of about 3% carbon black has been mixed with the Georgia-Pacific GP-745D63 resin described above to achieve a darker sheet.

The sheets can also be colored by reactive products. As mentioned above, one reactive product is a ferric oxide solution that can react with the phenolic resin used to impregnate the sheets in one embodiment. Further, the sheets can be produced and purchased as colored sheets prior to the impregnation. Those with ordinary skill in the art will recognize that there exists a number of ways of imparting a colorant to the sheets. The method of coloring and the stage at which the sheets are colored are not critical. The value of light attenuation for exiting light can be between about 0% to about 100% of the entering light to the cooling pad. In one embodiment, the pad can block at least about 50% and in some embodiments at least about 90% of the light passing through the pad.

In step 104, the impregnated paper is cut to lengths suitable for fabricating the evaporative cooling pad. Of course, it will be recognized that allowance must be made for the corrugation of the paper when the sheets are cut. In one particular version of the invention, the sheets are about 30 inches wide by about 56 inches to about 80 inches long. However, this is clearly a matter of design choice, and depends on the desired finish size of the final cooling pad.

The sheets are corrugated or fluted in step 106. There are at least two exemplary corrugation techniques that may be used. In one technique, the sheets are placed on a vacuum form table which has the desired corrugation pattern formed in the upper surface of the table. A vacuum is drawn through vacuum holes provided in the surface of the table that causes the sheet to conform to the corrugation pattern in the table surface. Afterwards, the corrugated sheet can be removed from the table and further processed as desired. The second method for corrugating the sheets is to pass the sheets through corrugating rolls that impress the desired pattern into the sheets. The exact corrugation technique is not critical and the invention will be described with respect to corrugation by corrugating rolls.

Figure 7:
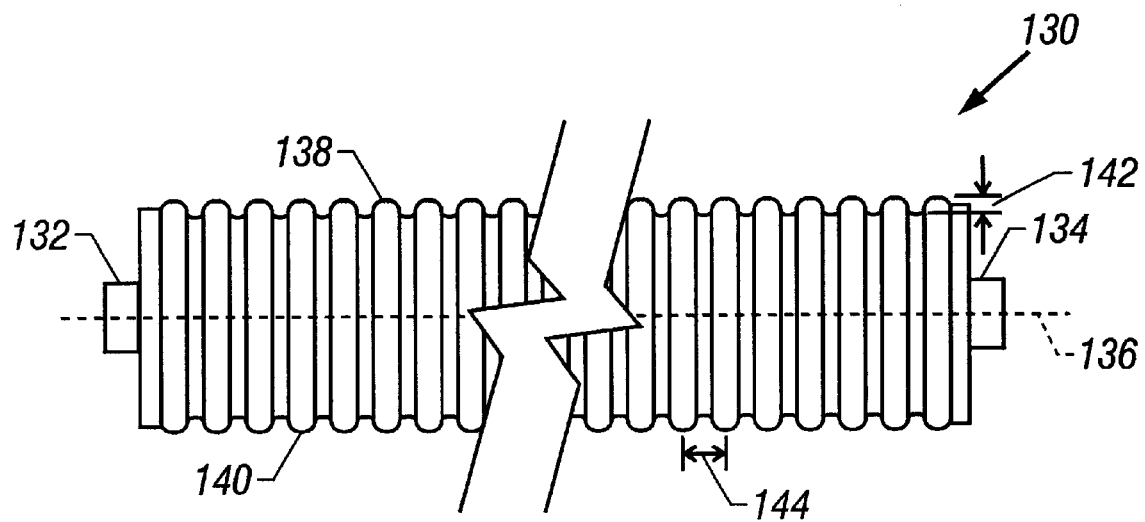
FIG. 7 is a side schematic view of a roll used to form the cooling pad sheets.

Referring now to FIG. 7, there is shown a side schematic view of a corrugation roll 130 useful in the present invention. The corrugation roll 130 has shaft ends 132, 134 that engage mechanical bearings (not shown) that allow the roll to rotate around its central axis 136. The surface 138 of the roll 130 that contacts the sheet is provided with the desired corrugation pattern. In one embodiment, the corrugation pattern may be a series of sinusoidal troughs 140 that are impressed into the impregnated sheet. Thus, the surface 138 of the roll 130 is provided with sinusoidal grooves formed about the surface 138. In one particular embodiment, the grooves have a depth 142 of about ¼ inches and a peak-to-peak distance 144 of about ⅞ inches. Other corrugation patterns could be substituted as a matter of design choice.

Figure 8:
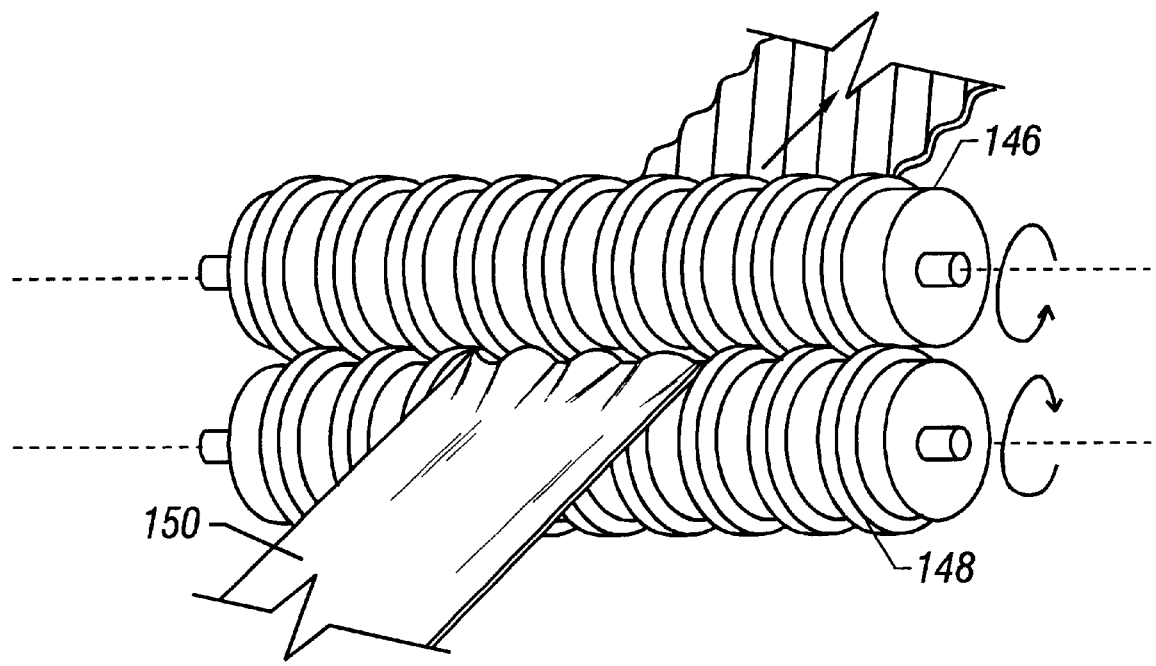
FIG. 8 is a schematic perspective view of rolls used to form the sheets.

The operation of the rolls is depicted in the perspective schematic view shown in FIG. 8. A top roll 146 is positioned over a lower roll 148. The shaft ends of the rolls 146, 148 are generally mounted in bearings (not shown) which allow the rolls 146, 148 to be mechanically rotated about each longitudinal axis in the directions indicated by the arrows. It is understood that the surfaces of the rolls 146, 148 may appear as discussed above or may have other patterns. A section of impregnated sheet 150 is fed into the rolls. The rotation of the rolls 146, 148 causes the rollers to "grab" the leading edge of the impregnated sheet 150 and pull it through to the opposite side of the rolls 146, 148. The rolls squeeze the impregnated sheet 150 therebetween and impart the corrugation pattern to the sheet 150 as the sheet 150 passes between the rolls.

The impregnated sheet 150 is pressed between the rolls 146, 148 with sufficient force to cause corrugations to be impressed into the sheet 150. If insufficient force is applied, either the corrugation pattern impressed into the sheet 150 will be too "flat," or it will not be sufficiently long lasting for the sheet 150 to withstand further processing. Accordingly, the top roll 146 contacts against the lower roll 148 with a substantial amount of force referred to as "load." The amount of load required will depend largely on the particular equipment and paper used in the process. Generally, loads between about 960 pounds per square inch (psi) and about 2640 psi have been found to be useful in an embodiment of the invention with a load of about 1680 psi being advantageous for the paper described earlier. It is to be understood that the forces could vary depending on the flute size and spacing, type of sheet used, and even humidity and temperature. Thus, the forces listed are exemplary and can be adjusted for individual processes. Also, in this embodiment, the rolls 146, 148 are rotated at a speed so that the sheet 150 passes between the rolls 146, 148 at a linear speed of about 150 feet per minute. Naturally, the rotational speed of the rolls 146, 148 required to achieve a linear speed of about 150 foot per minute will depend on the diameter of the rolls. Again, the speed is not critical as long as the paper is sufficiently impressed with the corrugation pattern.

Figure 9:
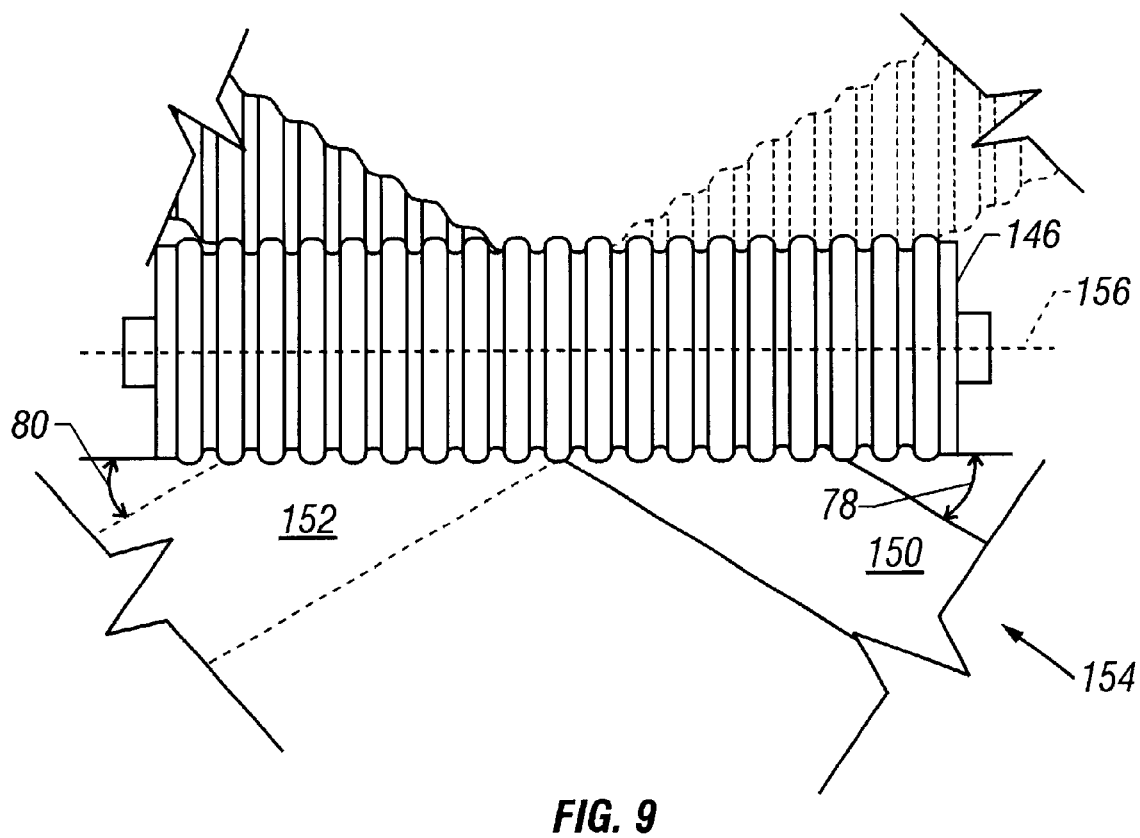
FIG. 9 is a schematic plan view of sheets at angles passing through a roll.
Figure 10:
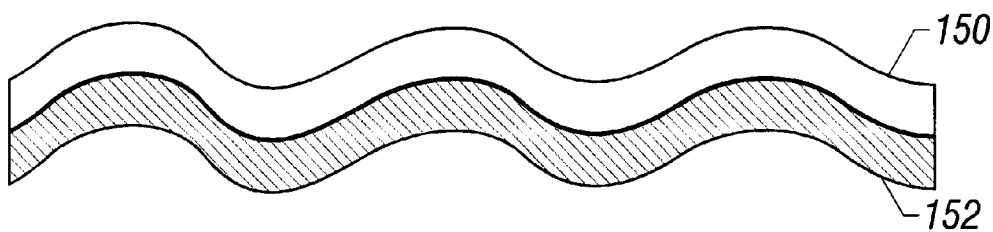
FIG. 10 is a cross-sectional side view showing an unfavored orientation of adjacent sheets.

Referring now to FIG. 9, there is shown a top view of the upper roll 146 as it corrugates a sheet 150 of impregnated paper. In this embodiment, it will be noted that the sheet is not fed directly, i.e., perpendicularly, into the corrugation rolls, but rather at an angle 78. By corrugating the sheet 150 at an angle, it prevents "nesting" between two adjacent sheets when they are stacked together to form an evaporative cooling pad. More specifically, it is undesirable to allow the sinusoidal flukes in the sheets to fit within each other shown, as shown in FIG. 10. The sheet 150 inappropriately nests within the sheet 152 so that little, if any, separation remains between the two sheets. This situation can be avoided if alternate sheets are passed between the rolls as shown in FIG. 9. The first sheet 150 is passed through the roll 146 as indicated by the arrow 154 at an angle 78. The second sheet 152 (as shown by dotted lines) is passed through the roll 146 from the opposite direction at an angle 80. Generally, these sheets 150, 152 are stacked against each other, so that the corrugations do not nest in the assembled product as depicted in FIG. 10.

Different flute angles 78, 80 are useful in various embodiments of the invention. In one embodiment, angles 78, 80 are each between about 30 degrees and about 60 degrees from the centerline of rotation 156 of the roll 146 and advantageously between about 30 degrees to about 38 degrees. In alternate embodiments, the angles 78 and 80 may differ from each other. For example, in one particular version of the invention, angle 78 is about 45 degrees while angle 80 is about 15 degrees. Each angle can be at least about 5 degrees.

Referring again to FIG. 6, after corrugation in step 106, the sheets of impregnated paper are preferably cured and tested in step 108. Conventionally, uncured corrugated sheets are glued together to form the pad and then the entire pad is cured by the application of heat. However, in the present invention, the sheets may be cured individually. This flexibility not only provides greater reliability in the finished evaporative cooling pad, but also allows more cost-effective shipment of the papers required to construct the evaporative cooling pads.

Figure 11:
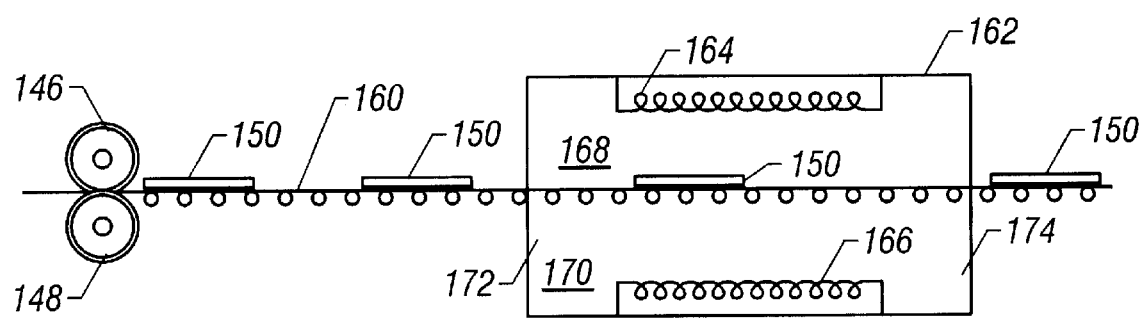
FIG. 11 is a schematic side view of a conveyor line with an oven.

FIG. 11 is a schematic diagram illustrating the process for curing the individual sheets 150 of impregnated paper according to an exemplary embodiment of the invention. In this case, after the sheets are passed through rolls 146, 148, the sheets can travel along a conveyer belt 160 and into a curing oven 162. The oven 162 cures the resins impregnated into the sheets 150 by the application of heat. The time and temperature requirements to completely cure the sheets 150 will depend upon a variety of factors, such as the particular resin and type of sheet used, as well as the ambient temperature and humidity at which the curing process is performed. The exact type of oven 162 used to cure the impregnated sheets 150 is not critical, as long as the desired heat/time profile can be maintained. Generally, it is desirable that the temperature profile of the curing oven 162 be accurately maintained. If the temperature profile of the oven 162 varies significantly across the sheet 150, a portion of the sheet may not be fully cured before it is used to construct an evaporative cooling pad. In such a situation, a weak spot in a pad can be formed because the resin in the uncured portion of the sheet 150 could be leached out of the paper by the water used in the evaporative cooler. The uncured portion can result in a failure of the cooling pad.

As one example and without limitation, the oven 162 design is a double-sided infrared oven, incorporating electric infra-red elements 164, 166 both on the top and on the bottom of the oven. The oven 162 allows even heat application from both sides of the sheet 150. In one embodiment, the spacing of the heating elements from both the top 168 and the bottom 170 can be about six inches (15.23 cm) from the conveyor belt 160. Other configurations can be made as a matter of design choice. Further, the oven 162 can be divided linearly into multiple zones 172, 174 that allows different power settings on each zone to control the increase or decrease in the heat exposure through the entire length of the oven 162. Similar functionality could also be obtained from an oven 162 using gas-fired or other heat producing methods.

The coordination of the power settings and conveyor belt 160 speed to achieve the best ratio of cure to production speed can be determined empirically through inspection of the sheets 150. The settings can be documented and used in the future.

The length of the oven 162 is generally a function of the maximum speed at which the production line is designed. If higher speeds are required, the power (exposure) setting of the infra-red elements can be increased, the size of the oven increased, and/or new zones can be added.

With an oven 162 such as described above, a conveyor belt 160 operating at between about 150 and about 200 feet per minute could expose each individual sheet 150 to a temperature between about 320° F. and 330° F. for about one-half minute. This time/temperature is generally sufficient to fully cure sheets 150 impregnated with resin such as the GP-745D63 resin described above. However, these parameters are only exemplary and those of skill in the art will have sufficient ability to modify these parameters for other types of heating ovens, sheets, and resins used.

Since each sheet can be generally cured individually, the present invention also allows for testing of each individual sheet after it is cured. This ability also provides for greater quality control in the finished evaporative cooling pad. It is now possible to ensure that the pad is constructed from only fully cured sheets of impregnated paper that have little, if any, uncured weak spots. Testing may be performed according to a variety of techniques, such as applying a ferric chloride solution. The ferric chloride solution used for testing the "B" stage or cure state of the phenolic resin is about a 5% solution of ferric oxide dissolved in a mild chloride solution (water and chlorine). The ferric chloride is reactive with non-cured phenol that causes a color change in the substrate (paper) carrying the phenol. If the area exposed to the ferric oxide darkens, the resin is not completely cured. The darker the result, the less cured the resin is. If the resin is completely cured, the solution remains unchanged.

After the sheets are cured and tested in step 108, they may be assembled into the final evaporative cooling pad according to steps 110 through 120, shown in FIG. 6. In step 110, glue may be applied to the sheets to hold them together during and after assembly. The method for applying the glue is not critical and is performed according to any number of known techniques. However, it will be noted that, unlike evaporative cooling pads manufactured according to conventional techniques, the sheets in the present invention are cured and, accordingly, resist water absorption. Thus, a water-based glue does not readily permeate the cured sheet and different glues are generally used.

Instead of the conventional urea-based glues, the present invention advantageously employs polymer-based glues to hold the sheets together. In particular, polymer-based glues having cross-linking characteristics that are advantageous due to their water-resistant qualities. Such glues also avoid the unpleasant odor of urea-based glues. In addition, the polymer-based glues should have a sufficient "open" time to allow for the construction of a complete evaporative cooling pad before the glue begins to dry. One particularly advantageous glue is Model No. 42-2113 (for winter use) or Model No. 42-2119 (for standard use) urethane-based glues commercially available from National Starch, Inc. These glues are two-part glues which are normally combined with Catalyst Number 2306 in order to provide the necessary chemical cross-linking.

Figure 12:
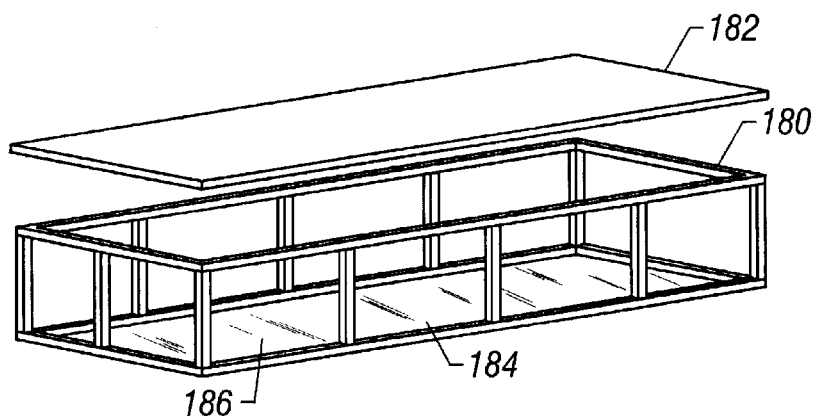
FIG. 12 shows a schematic perspective exploded view of a form used to hold the sheets during processing.

After the glue is applied to the sheets, the sheets may then be stacked together in step 112 to form the evaporative cooling pad. FIG. 12 is an exploded perspective view of a mold 180 and a mold lid 182 used to form the evaporative cooling pad 10. The individual sheets can be stacked into the mold 180 to a desired thickness. Sheets having different corrugation angles may be stacked so that adjacent sheets are stacked with opposing flute angles to avoid nesting and form the desired air flow path.

When a desired number of sheets have been stacked into the mold 180, the lid 182 can be placed on the mold 180 to hold the sheets in place while the glue dries. This step is depicted as step 114 in FIG. 6. Preferably, the walls of the mold are not solid, but are, instead, a series of bars 184 which hold the sheets in place while permitting air flow through the mold 180 including the bottom 186 to facilitate drying of the glue.

In order to facilitate production of the evaporative cooling pads, it is often desirable to facilitate the drying process of the glue by the application of heat depicted in step 116 in FIG. 6. It will be recalled that in conventional manufacturing processes, the entire evaporative cooling pad is cured as a block by the application of heat. This same heat also dries the glue used to hold the sheets together. However, if the sheets in the cooling pad according to the invention have been pre-cured, a separate application of heat is generally provided to facilitate the drying process. In one version of the invention, the mold 180 containing the stacked sheets of the evaporative cooling pad 10 is placed into a glue drying oven (not shown). The time and temperature required to dry the glue in the evaporative cooling pad will depend on the particular glue used and the ambient conditions under which the drying is performed. In one particular embodiment, the glue drying oven can be built around a conveyor line similar to that shown in FIG. 11. The mold 180 is conveyed through the oven and the glue is dried accordingly.

The finished evaporative cooling pad 10 is removed from the mold 180 and trimmed to the final desired size, depicted as step 118. The trimming can be done by a number of methods, including saws or shears. The cooling paid 10 may then be packaged for shipping, or installed in evaporative cooling units as desired, depicted as step 120. The trimming can be done be a number of methods including saws or shears.

While the foregoing is directed to various embodiments of the present invention, other and further embodiments may be devised without departing from the basic scope thereof. For example, the various methods and embodiments of the invention can be included in combination with each other to produce other variations of the disclosed methods and embodiments. Also, the directions such as "top," "bottom," "left," "right," "upper," "lower," and other directions and orientations are described herein for clarity in reference to the figures and are not to be limiting of the actual device or use of the device as the device may be used in a number of directions and orientations. Further, the various steps described herein can be combined with other steps, various steps can be interlineated with the stated steps, and the steps can occur in a variety of sequences unless otherwise specifically limited. Further, the headings herein are for the convenience of the reader and are not intended to limit the scope of the invention.

What is claimed:

1. An evaporative cooling pad having an entrance on one side of the pad and an exit on another side of the pad, the pad comprising:
   a) a plurality of corrugated sheets impregnated with a strengthening material capable of substantially maintaining the corrugations; and
   b) a colorant applied to the corrugated sheets to change a first color of the sheets to a darker second color wherein the combination of corrugations and second color block at least a portion of light between the entrance and the exit of the evaporative cooling pad.

2. The cooling pad of claim 1, wherein the pad blocks at least about 50% of the light between the entrance and the exit of the pad.

3. The cooling pad of claim 1, further comprising an evaporative cooler having a housing and a fan coupled to the housing wherein the cooling pad is coupled to the evaporative cooler.

4. The cooling pad of claim 1, wherein the strengthening material comprises a thermosetting resin.

5. The cooling pad of claim 1, wherein the colorant comprises an oxide that is reactive with the strengthening material.

6. The cooling pad of claim 1, wherein the colorant comprises a dye.

7. The cooling pad of claim 2, wherein the colorant is mixed with the strengthening material prior to impregnation of the corrugated sheets.

8. The cooling pad of claim 1, wherein the cooling pad comprises an impregnated sheet having a flute angled relative to the pad entrance of at least about 5 degrees.

9. The cooling pad of claim 8, wherein the cooling pad comprises an impregnated sheet having a flute overlapped at an angle relative to an adjacent flute on an adjacent sheet of at least about 10 degrees between the flutes.

10. The cooling pad of claim 1, wherein a surface of the corrugated sheets having the second color comprises a non-glossy finish.

11. An evaporative cooler, comprising:
   a) a molded cooler housing supported on a base, having an exterior, an interior, and front and rear openings;
   b) a fan coupled to the cooler housing;
   c) at least one evaporative cooling pad according to claim 1.

12. The evaporative cooler of claim 11, wherein the pad blocks at least about 50% of the light between the entrance and the exit of the pad.

13. The evaporative cooler of claim 11, wherein the colorant comprises an oxide that is reactive with the strengthening material.

14. The evaporative cooler of claim 11, wherein the colorant comprises a dye.

15. The evaporative cooler of claim 12, wherein the colorant is mixed with the strengthening material prior to impregnation of the corrugated sheets.

16. The evaporative cooler of claim 11, wherein the cooling pad comprises an impregnated sheet having a flute overlapped at an angle relative to an adjacent flute on an adjacent sheet of at least about 10 degrees between the flutes.

17. The evaporative cooler of claim 11, wherein a surface of the corrugated sheets having the second color comprises a non-glossy finish.

18. An evaporative cooling pad having an entrance on one side of the pad and an exit on another side of the pad, the pad comprising:
   a) a plurality of corrugated sheets impregnated with a strengthening material, comprising a phenolic aldehyde resin, capable of substantially maintaining the corrugations; and
   b) an oxide colorant applied to the corrugated sheets to change a first color of the sheets to a darker second color wherein the combination of corrugations and second color block at least a portion of light between the entrance and the exit of the evaporative cooling pad.

19. The cooling pad of claim 18, wherein the oxide colorant comprises ferric oxide.

20. The cooling pad of claim 18, wherein a surface of the corrugated sheets having the colorant comprises a non-glossy finish.

* * * * *